United States Patent
Bax

[15] 3,662,654
[45] May 16, 1972

[54] RECIPROCATING ROD AND SLEEVE ASSEMBLY WITH A LIQUID-SUPPORTED ROLLING DIAPHRAGM SEAL AND A PUMPING RING

[72] Inventor: Johannes Cornelis Bax, Emmasingel, Netherlands

[73] Assignee: U.S. Philips Corporation, New York, N.Y.

[22] Filed: Dec. 14, 1970

[21] Appl. No.: 97,585

[30] Foreign Application Priority Data
Jan. 8, 1970 Netherlands..........................7000189

[52] U.S. Cl................................................92/83, 417/550
[51] Int. Cl.......................................................F15b 21/04
[58] Field of Search...............92/83; 60/24; 184/24; 417/550

[56] References Cited
UNITED STATES PATENTS

| | | | |
|---|---|---|---|
| 2,614,793 | 10/1952 | Storm | 417/550 |
| 3,492,813 | 2/1970 | Meijer | 92/83 |
| 3,547,005 | 12/1970 | Van der Aa | 92/83 |

Primary Examiner—Martin P. Schwadron
Assistant Examiner—Leslie J. Payne
Attorney—Frank R. Trifari

[57] ABSTRACT

A device including a reciprocally moving piston and cylinder pair with a rolling-diaphragm seal secured between them and axially spaced therefrom a pumping ring disposed in an annular space between the piston and cylinder; also in this annular space intermediate the seal and pumping ring is a sleeve secured to the cylinder and releasably engagable to the ring, as part of a mounting assembly for the pumping ring.

5 Claims, 3 Drawing Figures

PATENTED MAY 16 1972

*INVENTOR.*
JOHANNES C. BAX

BY
AGENT

RECIPROCATING ROD AND SLEEVE ASSEMBLY WITH A LIQUID-SUPPORTED ROLLING DIAPHRAGM SEAL AND A PUMPING RING

The invention relates to a device comprising a relatively reciprocable rod and surrounding element, in particular a hot-gas reciprocating engine having a piston rod and a displacer rod movable therein, in which at least one liquid-supported rolling diaphragm is present as a seal between the rod and the surrounding element, which diaphragm separates a gas space from a space containing the supporting liquid; a pumping ring is present between the rod and the surrounding element on the side of the rolling diaphragm facing the liquid space, the ring, during operation of the device, moving with the surrounding element and being capable of supplying liquid to the liquid space.

Devices of the above-mentioned type are known, i.e. from Dutch Pat. No. 112,769 and U.S. Pat. No. 3,302,392, and are also constituted, for example, by compressors and piston expansion machines in addition to hot-gas reciprocating engines by which are to be understood hot-gas piston engines and cold-gas refrigerators.

In these known devices, the gas space usually is the working space but may it also be the buffer space, as in the hot-gas reciprocating engines of the displacer type. The rolling diaphragm is present in order to prevent gas from leaking away from the working space and to prevent contaminations, for example, lubricant from coming into said working space.

During operation of the device, liquid is supplied to the liquid space below the rolling diaphragm by the pumping ring, while usually a control device ensures that so much liquid is conducted away from the liquid space that a given desirable constant pressure differential is maintained across the rolling diaphragm. Pumping rings and their operation are known and described, for example, in Dutch Pat. No. 112,657.

A difficulty in the known device concerns the provision of a pumping ring in the device and the removal of the pumping ring out of the device, respectively. This difficulty presents itself notably in hot-gas reciprocating engines of the displacer type in which the provision and removal, respectively, of the pumping ring involves a cumbersome and time-consuming assembly and dismantling, respectively. This is caused by the fact that the pumping ring is present at a comparatively large distance from the piston and displacer, respectively, between the piston rod and displacer rod and that assembly and dismantling, respectively, of the pumping ring occurs in the least favorable manner from the gas space.

Once it is assembled, the pumping ring which is situated in a clamping manner around the displacer rod but is movable over it together with the piston rod and piston, is hard to dismantle from the gas space. It is the object of the present invention to avoid the difficulty described and to provide a device in which the provision and removal, of the pumping ring can be effected in a simple and rapid manner.

In order to realize this object, the device according to the invention is characterized in that the surrounding element has, throughout the longitudinal part which extends from the pumping ring in the direction of the gas space, an inside diameter which exceeds the outside diameter of the rod, a sleeve being arranged in the gap thus formed and surrounding the rod and, at least in the axial direction, being incorporated therein immovably relative to the surrounding element and in a sealing manner, the end of the sleeve remote from the gas space having a tapering which surrounds the pumping ring at least partly, the wall parts facing each other of the tapering and the pumping ring comprising grooves which extend at right angle to the axial direction and are situated opposite to each other and in which a wire-shaped or ribbon-shaped connection element is accommodated supplied thereto via a radial aperture in the wall of the tapering.

The provision and removal of the pumping ring is now effected in an easy manner by providing and removing the sleeve to which the pumping ring is coupled via the wire-shaped or ribbon-shaped connection element in the common duct formed by the grooves.

BRIEF DESCRIPTION OF THE DRAWINGS

In order that the invention may be readily carried into effect, it will now be described in greater detail, by way of example, with reference to the accompanying drawings, in which.

DESCRIPTION OF THE PREFERRED EMBODIMENTS

Figure 1:
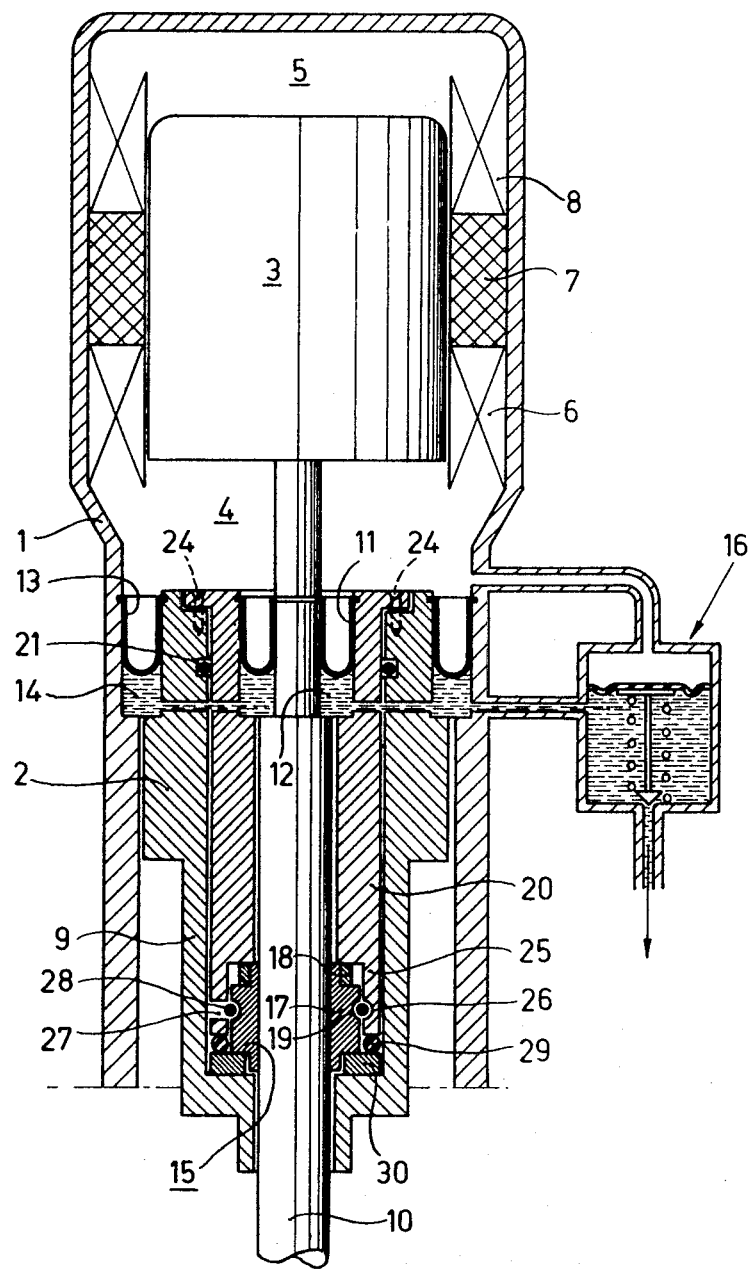
FIG. 1 shows diagrammatically and not to scale a part of a hot-gas engine having a displacer rod and a piston/piston rod surrounding said displacer rod.

Reference numeral 1 in FIG. 1 denotes a cylinder in which a piston 2 and a displacer 3 reciprocate. A compression space 4 is present between the piston 2 and the lower side of the displacer 3, while an expansion space 5 is present above the displacer 3. These two spaces communicate with each other via a cooler 6, a regenerator 7 and a heater 8.

The piston 2 is connected, through a hollow piston rod 9, to a driving mechanism (not shown) which is accommodated in a crankcase (not shown) containing lubricating oil. The displacer 3 is also connected to the driving mechanism (not shown) via a displacer rod 10 which is passed through the piston 2 and the piston rod 9.

A rolling diaphragm 11 which separates the compression space 4 which is filled with a gaseous working medium from a liquid space 12 is arranged between the piston 2 and the displacer rod 10. Furthermore, a rolling diaphragm 13 is present between the piston 2 and the cylinder 1, said diaphragm separating the compression space 4 from a liquid space 14. The liquid space 12 is in open communication with the liquid space 14. The rolling diaphragms ensure that working medium cannot enter the crankcase and that, conversely, lubricating oil from the crankcase cannot pollute the compression space, regenerator, and so on.

By means of a pumping ring 15, which is present in an annular space between the piston rod 9 and the displacer rod 10 and which moves with the piston rod, lubricating oil from the crankcase can be pumped to the liquid spaces 12 and 14 in order to support there the rolling diaphragms 11 and 13. Furthermore, a control device 16 is present which ensures that a sufficient quantity of lubricating oil is always conducted away from the liquid spaces 12 and 14 to the crankcase, that an at least substantially constant pressure differential prevails across the rolling diaphragms 11 and 13. The operation and construction of the rolling diaphragms and the control device being known, further explanation will not be given here.

In this embodiment the pumping ring 15 is part of a pumping ring mounting assembly consists of a sleeve 17 which tightly engages the displacer rod 10 and a shrink ring 18 arranged on the upper side around the sleeve. The shrink ring 18 forces the sleeve 17 on the upper side against the displacer rod and ensures that in the case of relative movement of the piston rod and the displacer rod, lubricating oil is pumped to the liquid spaces 12 and 14, while, in the direction of the liquid space 12 to the crankcase, the pumping ring serves as a seal. Of course other constructions of the pumping ring are also possible, for example, as described in Dutch Pat. No. 112,657.

The pumping ring 15 furthermore comprises a circumferential groove 19 arranged on the outer wall of the sleeve 17. A sleeve 20, via O-ring 21 seal, is incorporated in the piston/piston rod and is secured thereto via screws 24, is arranged between the piston 2 and the piston rod 9, respectively, and the displacer rod 10. The rolling diaphragm 11 is secured to the sleeve 20.

At the end remote from the compression space 4, the sleeve 20 has a flange or shoulder 25 which partly surrounds the pumping ring 15. The flange 25 comprises a circumferential groove 26 which is provided in the inner wall and which, together with the groove 19 of the pumping ring 15, constitutes a torus-shaped duct. The flange furthermore comprises a radial aperture 27 through which a wire 28 is supplied to the torus-shaped duct. The wire has such a cross-section that on the one hand it is incorporated in the duct with some play so that the pumping ring can follow slight movements of the displacer rod within the guide, and on the other hand holds the pumping ring inside the flange of the sleeve.

Furthermore, an O-ring 29 is present as a seal, as well as an adjusting ring 30. If the pumping ring 15 is to be removed from the hot-gas engine, screws 24 are unscrewed and removed and rolling diaphragm 11 is detached from the sleeve 20 and/or displacer rod 10. The sleeve 20 is then moved upwards, the wire 28 ensuring that the pumping ring 15 clamped around the displacer rod 10 is also moved upwards with the sleeve 20. By removing the wire 28 through aperture 27, the coupling between the pumping ring 15 and the sleeve 20 is interrupted. Assembly of a pumping ring in a hot-gas engine occurs in the reverse sequence.

Figure 2A:
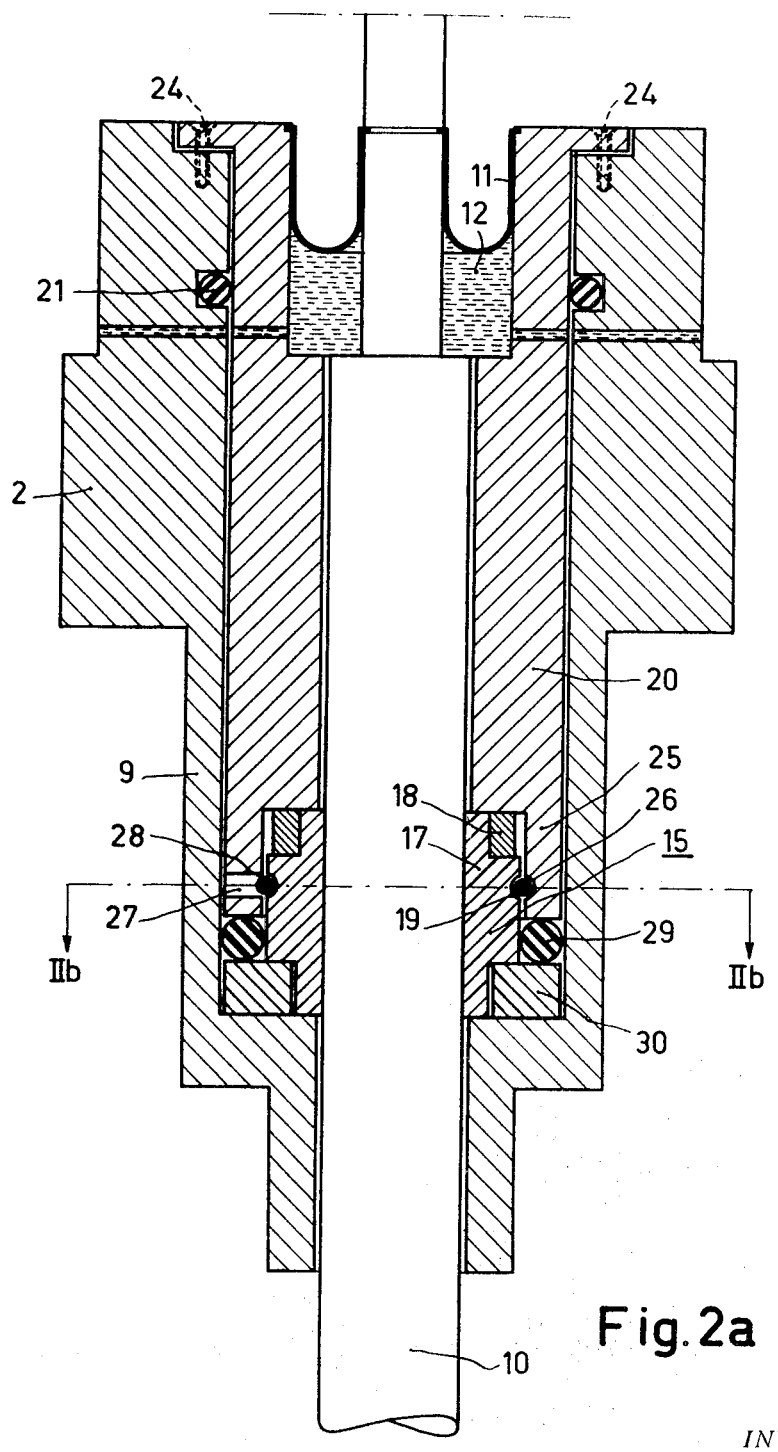
FIG. 2 shows separately and on a larger scale the combination of displacer rod and piston/piston rod.

FIG. 2a shows the combination of displacer rod and piston/piston rod of FIG. 1 on an enlarged scale. The same reference numerals as in FIG. 1 are used for corresponding components.

Figure 2B:
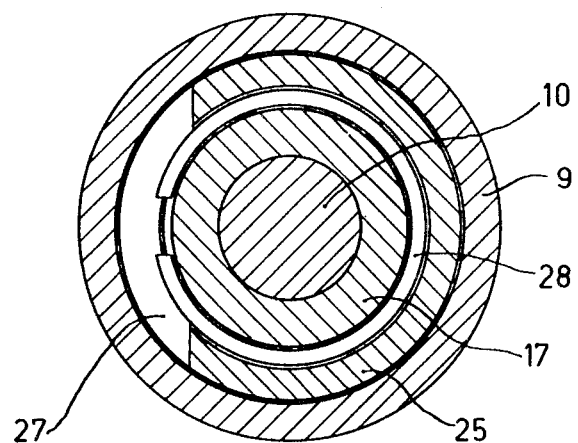

FIG. 2b is a cross-sectional view taken on the line IIb of FIG. 2a.

In the device shown in the drawing, the sleeve 20 ends in the working face of the piston 2 and a part of the inner wall of the sleeve constitutes a boundary of the liquid space 12. However, it is of course also possible that the sleeve does not continue to in the working face of the piston but ends, for example, in the piston rod. In the latter case, the sleeve could be reached by removing the piston from the piston rod. Furthermore, the liquid space 11 can also be bounded by wall parts of the piston 2 instead of by wall parts of the sleeve 20.

What is claimed is:

1. In a device including a relatively reciprocable rod and a surrounding element, in particular a hot-gas reciprocating engine having a piston rod and a displacer rod movable therein, in which at least one liquid-supported rolling diaphragm is present as a seal between the rod and the surrounding element, which diaphragm separates a gas space from a space containing the supporting liquid, and a pumping ring is present between the rod and the surrounding element on the side of the rolling diaphragm facing the liquid space, said ring, during operation of the device, moving with the surrounding element and being capable of supplying liquid to the liquid space, the surrounding element of the device having a longitudinal part which extends from the pumping ring in the direction of the gas space, and defining an inside diameter which exceeds the outside diameter of the rod, thus forming an annular gap, the device further comprising a sleeve arranged in the gap surrounding the rod and, the sleeve at least in the axial direction, being immovable relative to the surrounding element and being incorporated therein in a sealing manner, the sleeve having one end remote from the gas space having an expanded bore which surrounds the pumping ring at least partly, this bore and ring having wall parts facing each other and each defining a part of a single groove which extend at right angles to the axial direction and is situated opposite the other, and a connection element disposed in said groove.

2. In a hot-gas engine including a displacer rod axially reciprocal within a tubular piston rod, a rolling diaphragm seal secured between said rods defining gas and liquid spaces respectively above and below said seal, the two rods having overlying parts defining between them an annular space, a pumping ring disposed about said piston rod in said annular space, and axially spaced from said seal on the liquid side thereof, the improvement in combination therewith of a pumping ring mounting assembly comprising: a sleeve disposed in said annular space, the sleeve having a first end releasably securable to said piston, and a second end releasably engagable to said pumping ring, the sleeve's second end defining a bore having inner diameter corresponding to the outer diameter of the pumping ring and defining overlying surfaces, and means for engaging said overlying surfaces, whereby, the pumping ring is removable from the engine when the sleeve's first end is disconnected from the piston and the sleeve, to which is engaged said ring, is removed.

3. Apparatus according to claim 2 wherein said overlying surfaces each define a portion of an annular groove, and said means for engaging said overlying surfaces comprises an element disposable partially in each portion of said groove.

4. Apparatus according to claim 3 wherein said element comprises a section of wire.

5. Apparatus according to claim 3 wherein said pumping ring mounting assembly further comprises seal means between said second end of the sleeve and the corresponding end of said annular space formed by said piston.

* * * * *